(12) United States Patent
Adelsberg et al.

(10) Patent No.: US 8,269,131 B2
(45) Date of Patent: Sep. 18, 2012

(54) NICKEL-CONTAINING FLANGES FOR USE IN DIRECT RESISTANCE HEATING OF PLATINUM-CONTAINING VESSELS

(75) Inventors: Lee Martin Adelsberg, Elmira, NY (US); Steven Roy Burdette, Big Flats, NY (US); Joyce C Gillis Dunbar, Corning, NY (US); James Patrick Murphy, Corning, NY (US)

(73) Assignee: Corning Incorporated, Corning, NY (US)

( * ) Notice: Subject to any disclaimer, the term of this patent is extended or adjusted under 35 U.S.C. 154(b) by 1076 days.

(21) Appl. No.: 12/217,656

(22) Filed: Jul. 8, 2008

(65) Prior Publication Data

US 2009/0217709 A1    Sep. 3, 2009

Related U.S. Application Data

(60) Provisional application No. 61/067,500, filed on Feb. 28, 2008.

(51) Int. Cl.
*B23K 9/00* (2006.01)
(52) U.S. Cl. ........................ 219/59.1; 65/355
(58) Field of Classification Search .................. 65/122, 65/123, 125–129, 324–327, 145, 135.6, 334, 65/347, 335, 356, 374.1, 374.11, 374.12, 65/492, 493, 495, 499, DIG. 4; 373/28–41; 222/592, 593, 146.2; 219/59.1
See application file for complete search history.

(56) References Cited

U.S. PATENT DOCUMENTS

| | | | |
|---|---|---|---|
| 4,397,665 A * | 8/1983 | Harris | 65/512 |
| 6,076,375 A | 6/2000 | Dembicki et al. | 65/326 |
| 7,013,677 B2 | 3/2006 | Singer | 665/327 |
| 2008/0050609 A1 * | 2/2008 | Abe et al. | 428/592 |
| 2008/0083250 A1 | 4/2008 | Nagno et al. | 65/355 |
| 2008/0087046 A1 * | 4/2008 | Hirabara et al. | 65/355 |
| 2008/0092597 A1 * | 4/2008 | Itoh et al. | 65/355 |

FOREIGN PATENT DOCUMENTS

DE    19948634    2/2005

(Continued)

OTHER PUBLICATIONS

ASM Handbook, vol. 2, "Properties and Selection: Nonferrous Alloys and Special-Purpose Materials", 1990, p. 713.

(Continued)

*Primary Examiner* — Henry Yuen
*Assistant Examiner* — Thien S Tran
(74) *Attorney, Agent, or Firm* — Thomas R. Beall

(57) ABSTRACT

A flange (13) for use in direct resistance heating of a glass-carrying vessel (10), such as a finer, is provided. The flange comprises a plurality of electrically-conductive rings which include an innermost ring (140) which is joined to the vessel's exterior wall (12) during use of the flange and an outermost ring (150) which receives electrical current during use of the flange. The innermost ring (140) comprises a high-temperature metal which comprises at least 80% platinum and the outermost ring (150) comprises at least 99.0% nickel. This combination of materials both increases the reliability of the flange and reduces its cost. In certain embodiments, the flange can also include one or more rings (190) composed of a platinum-nickel alloy which has a lower thermal conductivity than platinum or nickel and thus can serve to reduce heat loss through the flange.

12 Claims, 6 Drawing Sheets

FOREIGN PATENT DOCUMENTS

| | | |
|---|---|---|
| EP | 1 857 420 | 11/2007 |
| JP | 2009-298671 | 12/2009 |

OTHER PUBLICATIONS

O. Kubaschewski and B.E. Hopkins, "Oxidation of Metals and Alloys", Academic Press, 1962, pp. 91, 108, 119, 144, 243.

H. Luo and P. Duwez, "Solid Solutions of rhodium with copper and nickel", J. Less Common Metals, 1964, vol. 6, pp. 248-249.

Y. Terada, K. Ohkubo, and T. Mohri, "Thermal Conductivities of Platinum Alloys at High Temperatures", Platinum Metals Review, 2005, vol. 49, pp. 21-26.

D. E. Thomas, "Discussion—On the Mechanism of Oxidation of Nickel-Platinum Alloys", J. Inst. Metals (1949), vol. 76, pp. 738-741.

C. Wagner, "Theoretical Analysis of the Diffusion Processes Determining the Oxidation Rate of Alloys", J. Electrochem Soc., vol. 99, (1952) pp. 369-380.

\* cited by examiner

NICKEL-CONTAINING FLANGES FOR USE IN DIRECT RESISTANCE HEATING OF PLATINUM-CONTAINING VESSELS

RELATED APPLICATION

This application claims the benefit of and priority to U.S. Provisional Application Ser. No. 61/067,500 filed on Feb. 28, 2008, the contents of which are relied upon and incorporated herein by reference in its entirety.

I. FIELD OF THE INVENTION

This invention relates to glass making and in particular to the direct resistance heating of platinum-containing vessels used to hold or transport molten glass, e.g., vessels such as melters, finers, stir chambers, formers, connecting tubes, and the like.

II. BACKGROUND OF THE INVENTION

As is well-known, platinum-containing materials, i.e., materials which contain at least 80 wt. % platinum, are widely used in the manufacture of glass and glass products because of their high melting temperatures, low levels of oxidation at elevated temperatures, resistance to corrosion by glass melts, and low levels of contamination of molten glass. As is also well-known, platinum-containing materials are notoriously expensive. Accordingly, substantial reductions in capital costs can be achieved by even small reductions in the amount of platinum-containing materials used in a glass manufacturing facility.

Among the valuable characteristics of platinum-containing materials is their ability to generate heat when conducting electricity. As a result, molten glass flowing through, or held in, a platinum-containing vessel can be heated by passing electrical current between one or more locations along the length of the vessel's exterior wall. Such heating is known in the art as "direct heating," "resistance heating," or "direct resistance heating," the term used herein.

A major challenge in direct resistance heating is the introduction and removal of the electric current from the vessel's wall. This is not only an electrical problem, but is also a thermal problem since the materials used to carry current to and from the wall will also conduct heat away from the wall. As a result, cold spots can be generated at the wall which can be detrimental to the quality of the finished glass, especially for glasses having strict quality requirements, such as those used to make substrates for liquid crystal displays (LCDs).

One way of introducing current into a vessel's wall is through the use of an electrically-conductive flange. Examples of such flanges can be found in U.S. Pat. Nos. 6,076,375 and 7,013,677. The present invention is concerned with flanges used to introduce current into a platinum-containing vessel wall and, in particular, with the reliability and cost of such flanges.

III. SUMMARY OF THE INVENTION

In accordance with one aspect, the invention provides a flange for use in direct resistance heating of a vessel (10) which, during use, carries molten glass and which comprises an exterior wall (12) which comprises at least 80% platinum, said flange comprising:

(a) a plurality of electrically-conductive rings (e.g., in FIGS. 4-6, rings 140,141,142,150,151,190) which, during use, form a conductive path for carrying current to the exterior wall (12), said plurality of rings comprising:

(i) an innermost ring (140) which is joined to and electrically connected with the vessel's exterior wall (12) during use of the flange; and (ii) an outermost ring (150) which receives electrical current during use of the flange; and (b) a cooling channel (160) associated with the outermost ring (150) through which a cooling fluid (i.e., a liquid or a gas) flows during use of the flange;

wherein:

(i) the innermost ring (140) comprises a high-temperature metal which comprises at least 80% platinum; and (ii) the outermost ring (150) comprises at least 99.0 wt. % nickel.

In certain embodiments, the cooling channel is a cooling tube that comprises at least 99.0 wt. % nickel. In other embodiments, the outermost ring has a sufficient thickness so that during use of the flange, the variation in calculated radial electrical current density along the ring's inner periphery is less than fifty percent.

In accordance with another aspect, the plurality of electrically conductive rings comprises a ring (190) which (i) is located between the outermost (150) and innermost (140) rings and (ii) comprises a platinum-nickel alloy, e.g., an alloy which comprises at least 77 wt. % platinum.

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

IV. BRIEF DESCRIPTION OF THE DRAWINGS

V. DETAILED DESCRIPTION OF THE INVENTION AND ITS PREFERRED EMBODIMENTS

Figure 1:
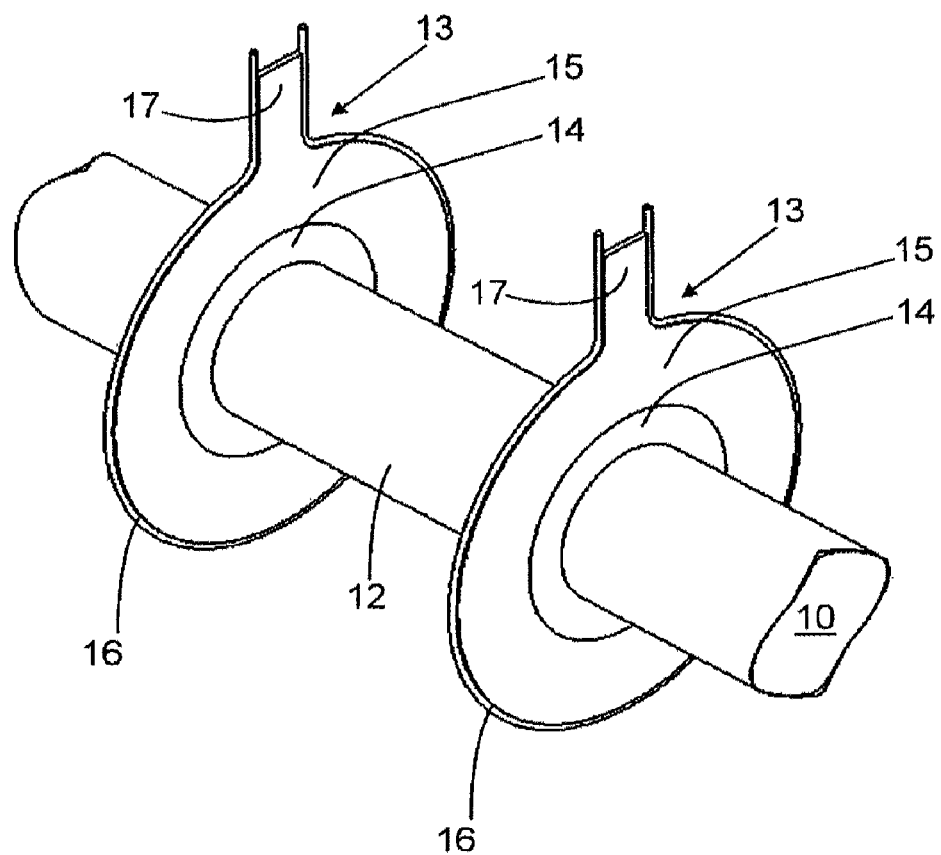
FIG. 1 is a schematic drawing illustrating the use of current-carrying flanges to heat the exterior wall of a glass-carrying vessel. The flange includes platinum-containing rings and a copper cooling tube.
Figure 2:
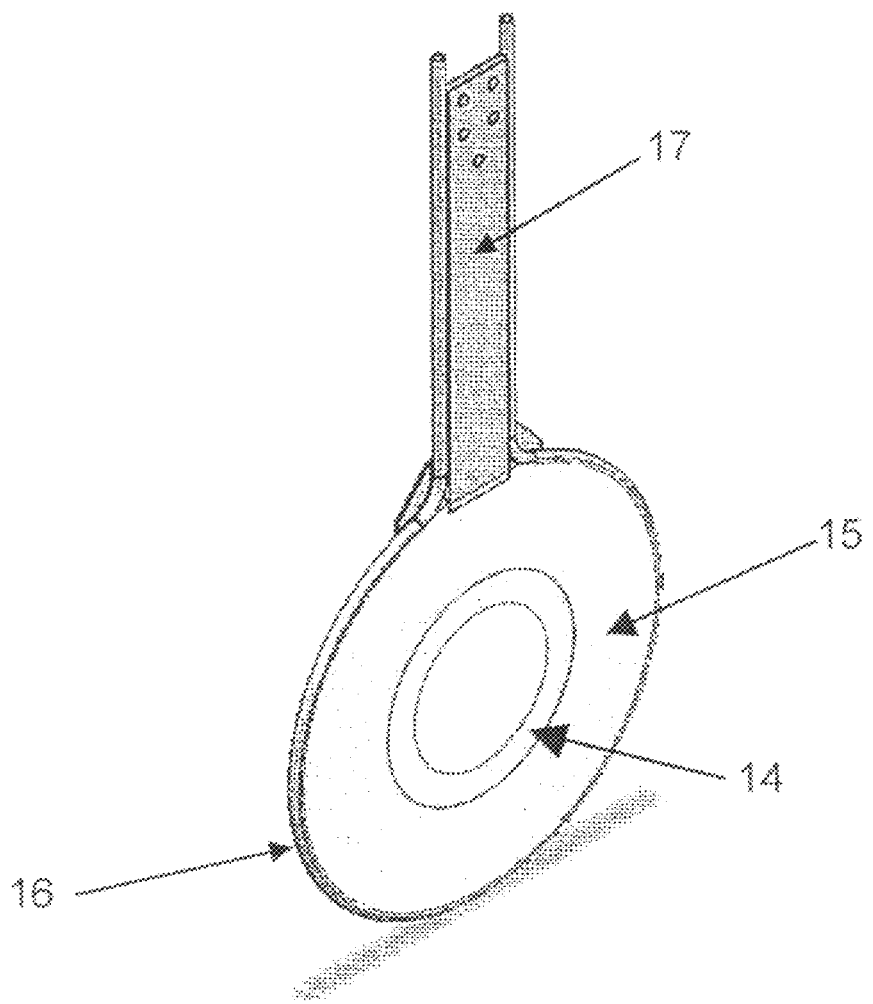
FIG. 2 is a schematic drawing showing one of the flanges of FIG. 1.
Figure 3:
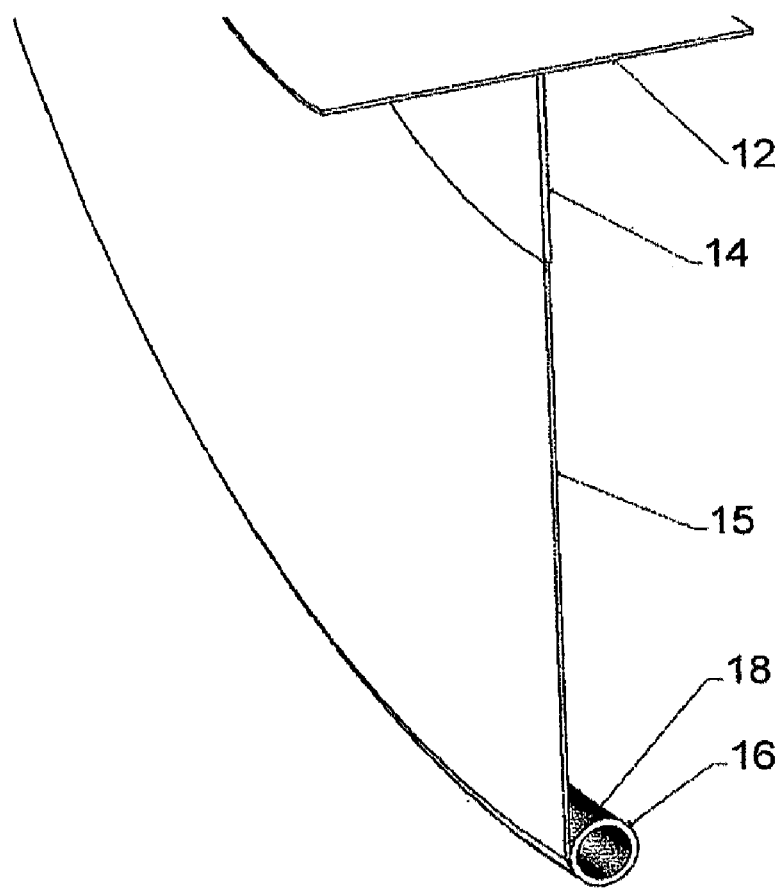
FIG. 3 is a cross-section of the flange of FIG. 2.

FIGS. 1-3 illustrate a direct resistance heating system employing a copper-based cooling/bus bar assembly. FIG. 1 shows a vessel 10 (in this case a tubular vessel such as a finer) having an exterior wall 12 to which are attached two flanges 13 which apply electrical current to wall 12.

Although only two flanges are shown, in practice, multiple flanges can be used for any particular vessel to provide electrical current to different sections of the vessel's exterior wall. Also, although the exterior wall in FIG. 1 has a circular shape, the wall can have a variety of other shapes, such as, elliptical, oval, square, rectangular, and the like. The central aperture of the flange will then have a shape suitable for introducing current into the vessel's wall, preferably around its entire circumference. Although not shown in FIG. 1, during use, the vessel's wall and the flanges will normally be surrounded by thick layers of insulating refractory materials to control heat loss from the vessel.

FIGS. 2 and 3 show the construction of the flanges of FIG. 1 in more detail. As can be seen in these figures, the flange includes two rings 14,15 made of a platinum-containing material, e.g., platinum or a platinum-rhodium alloy. These rings are welded to one another and the inner ring 14 is joined, e.g., welded, to exterior wall 12 of vessel 10. Rings 14 and 15 have different thicknesses, the inner ring 14 being thicker than the outer ring 15. As discussed in more detail below, in this way, the current density throughout the flange can be made less than the current density in the vessel's wall 12. Because the heat generated by electrical current is proportional to current density, keeping the current density in the flange less than the current density in the vessel's wall minimizes heat generation in the flange. Accordingly, more direct electrical heating occurs in the vessel wall than in the flange, as is desired.

In addition to rings 14 and 15, the flange of FIGS. 1-3, includes cooling tube/circular bus bar 16 and main bus bar 17, both of which are made of copper. The bus bar is electrically connected to a current source (not shown) and the cooling tube is joined to ring 15 using silver solder. Water is circulated through the cooling tube to keep the tube, the main bus bar, and the silver solder at temperatures below those at which they will rapidly oxidize and/or melt. Substantial cooling is required because copper rapidly oxidizes at 400-500° C. and the temperature of the molten glass in vessel 10 can be around 1600° C.

In addition to its cooling function, copper tube 16 also functions as a bus bar to distribute current around the periphery of ring 15. In particular, tube 16 produces a current distribution that is sufficiently uniform so as to minimize the formation of hot spots on the surface of the vessel near the location where the flange is joined to the vessel. In particular, hot spots develop in areas of high current density and cold spots in areas of low current density. Hot spots and cold spots produce temperature gradients which are undesirable in a glass delivery system since one of the sources of defects in finished glass, e.g., finished glass sheets, is the presence of temperature gradients. Glass flow is also disrupted by temperature gradients.

In practice, it was found that the flange of FIGS. 1-3 can be improved in a number of areas. For example, it can be difficult to produce consistently good brazed/solder joints between copper tubing and platinum. Also, cracking problems have been associated with direct welds between copper and platinum. This cracking is believed to be due to undesirable phases that can form in a copper-platinum system (see H. Luo and P. Duwez, "Solid Solutions of rhodium with copper and nickel", J. Less common Metals, 1964, vol 6, pp 248-249).

More importantly, if water flow through tube 16 is interrupted for any reason, an entire glass production line can be put at jeopardy in a very short period of time, e.g., 5-35 minutes. As the temperature rises, the copper tube can oxidize to failure very quickly, which can generate a catastrophic water leak when the water flow is restored. Also, the silver solder, which bonds the copper tube to ring 15, melts in a matter of minutes at elevated temperatures. In either case, the glass production line must be shut down so that the affected flange or flanges can be replaced or repaired. This represents a substantial loss in output, especially for high volume production lines such as those used to produce LCD substrates where it can take days to weeks before production is returned to normal after a shut down.

In certain embodiments, the flanges of FIGS. 1-3 are improved through the employment in the flange of an outermost ring (ring 150 in FIGS. 4-5) which comprises at least 99.0 wt. % nickel. In other embodiments, the flange also includes a cooling channel in the form of a cooling tube and a main bus bar, each of which comprises at least 99.0 wt. % nickel.

The nickel can, for example, be commercially pure nickel, such as, nickel 200 or nickel 201, which are readily available at low cost compared to platinum and platinum alloys. When used in a power flange, nickel provides an excellent combination of electrical resistance, thermal conductivity, oxidation resistance, solubility with platinum and rhodium, machinability, price, and availability in many forms and shapes, which other high temperature materials cannot match.

The use of nickel for the above components of a power flange has been found to significantly improve the ability of the flange to withstand temporary stoppages in the flow of cooling water. In particular, the flange exhibits a high level of oxidation resistance so that if cooling water flow is interrupted, the flange will remain operable for up to several days. The superior oxidation resistance of the nickel-containing flange provides sufficient time to restore coolant flow without loss of the platinum part and thus without the need to interrupt the flow of glass through the vessel.

In addition to its ability to withstand temporary interruptions in coolant flow, nickel-containing flanges also require less cooling than copper-containing flanges. Accordingly, in general, less direct resistance heating is needed when a nickel-containing flange is used. This reduction in direct resistance heating, in turn, reduces operational costs for electricity and capital costs in terms of the capacity of the electrical source needed to power the direct heating system.

In addition to these functional benefits, the use of one or more rings which comprise nickel significantly reduces the cost of the flange since the nickel is used at locations where platinum or a platinum alloy is used in a copper-containing flange. Although the prices of nickel and platinum vary over time, as a rule of thumb, platinum is at least 400 times more expensive than nickel and sometimes can be more than 1800 times more expensive.

Figure 4:
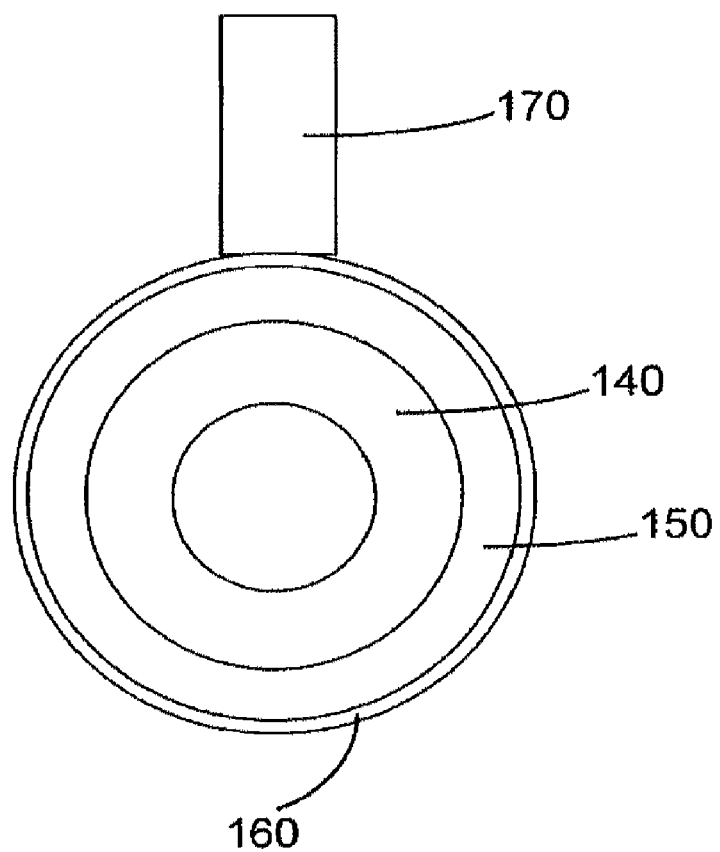
FIG. 4 is a plan view of a flange which includes a platinum-containing ring, a nickel-containing ring, and a nickel-containing cooling tube.

FIG. 4 shows a basic structure for a nickel-containing flange 130 constructed in accordance with an embodiment of the invention. In this figure, reference number 150 is the outermost ring of the flange and is formed from commercially pure nickel, while reference number 140 is the flange's innermost ring and is formed of platinum or a platinum alloy, e.g., a platinum-rhodium alloy. More generally, ring 150 comprises at least 99.0 wt. % nickel and ring 140 comprises a high-temperature metal (i.e., as used herein, a metal capable of operating at temperatures above 1500° C.) which comprises at least 80 wt. % platinum, with the remainder, if any, being one or more of: rhodium, iridium, gold, finely divided metal oxides such as zirconium dioxide, and the like. As one example, ring 140 can comprise 90 wt. % platinum and 10 wt. % rhodium.

As also shown in FIG. 4, the flange can include a main bus bar 170, which is used to connect the flange to a power source (not shown), and a cooling channel in the form of cooling tube 160. In an embodiment of the invention, each of these components comprises at least 99.0 wt. % nickel and are welded to outermost ring 150. The cooling channel carries a cooling fluid, which may be a liquid, e.g., water, or a gas, e.g., air. Although drawn as a separate component in FIG. 4, the cooling channel can be formed in outermost ring 150 if desired, e.g., the cooling channel can be machined into the outermost ring.

Figure 5:
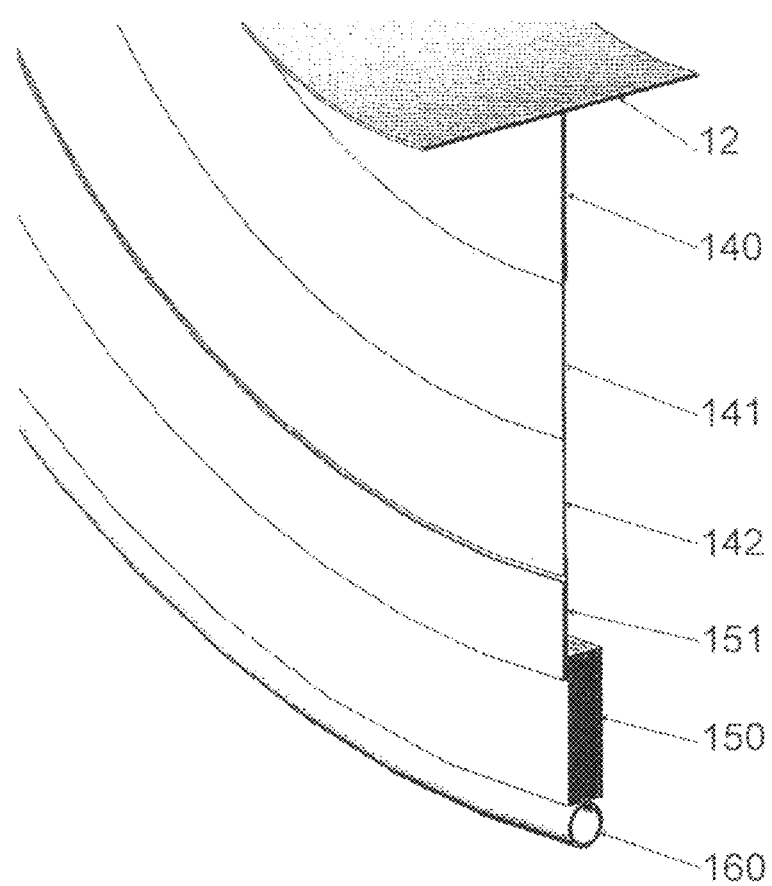
FIG. 5 is a cross-section of a flange which includes platinum-containing rings, nickel-containing rings, and a nickel-containing cooling tube.

FIG. 5 shows another nickel-containing flange where additional rings have been included in the flange to provide finer control over the current distribution within the ring. In particular, in addition to innermost ring 140 which comprises at least 80 wt. % platinum, this embodiment includes high-temperature metal rings 141 and 142 which also comprise at least 80 wt. % platinum. In certain embodiments, these additional rings have the same composition as ring 140, although they can have different compositions if desired.

The FIG. 5 embodiment also includes outermost ring 150 which comprises at least 99.0 wt. % nickel as well as additional ring 151 which similarly comprises at least 99.0 wt. % nickel. In certain embodiments, this additional ring has the same composition as ring 150, although it can have a different composition if desired.

Although in FIG. 5, two additional platinum-containing rings and one additional nickel-containing ring are shown, it should be understood that more or less additional rings can be used in the practice of the invention. Indeed, as illustrated in FIG. 4, the invention can be practiced with just an innermost platinum-containing ring and an outermost nickel-containing ring.

In FIG. 5, rings 140, 141, 142, 150, and 151 have different thicknesses. These thicknesses are chosen to control the current density as a function of radial position. A number of considerations come into play in selecting these thicknesses. First, as discussed above, the primary goal of direct resistance heating is to heat the molten glass in vessel 10, not to heat the flanges supplying current to the vessel's wall. Accordingly, the current density in the flange should be less than the current density in the wall. Second, the current density needs to be controlled so that parts of the flange do not become overheated and thereby damaged. This is particularly a problem for those portions of the flange which experience higher ambient temperatures during use.

As a starting point for selecting ring thicknesses, it can be noted that a circular flange constructed of a single material having a constant thickness will have a current density that increases linearly with decreasing radius, i.e., the current density will be the smallest at the outer edge of the flange and the greatest at the inner edge. To offset this effect, the thickness of the flange will typically increase as the radius becomes smaller. In terms of temperature, the ambient temperature normally drops as one moves outward from vessel 10 and thus current density can be higher towards the outside of the flange where the chances of damage due to overheating are less. This also leads to a flange whose thickness becomes smaller as the radius increases. Such reduced thickness is also desirable in terms of minimizing the amount of material used to construct the flange, especially in the case of expensive platinum-containing materials.

A further factor involves the resistivity of the material making up the flange, especially where more than one type of material is being used. The higher the resistivity, the greater the direct heating effect for the same current density. Also, to obtain a bus bar effect, it can be desirable for the outermost ring of the flange to have a substantial thickness so that the ring has a low resistance to circumferential current flow. More particularly, in certain embodiments, the variation in calculated radial current density (i.e., the modeled current density variation; see below) around the circumference of the outermost ring is less than 50%.

In addition to these electrical considerations, the effects of operating temperature on the nickel-containing components of the flange also need to be considered. In general terms, suitable temperatures for the nickel-containing components of the flange are: (1) less than about 600° C. in normal operation with water cooling, (2) less than about 800° C. with air cooling, and (3) less than about 1000° C. uncooled. At about 600° C. and below, nickel has a sufficiently low oxidation rate so that flange lifetimes of three years or more can be achieved. At about 1000° C., the usable lifetime is less than 30 days. The lifetime at about 800° C. is between these values, and may be acceptable for some applications, especially if exposing the nickel to these temperatures allows air cooling to be used which can often be less complex than water cooling.

More generally, temperatures decrease in the refractory insulation as the radial position from the axis of the glass-containing vessel is increased. Temperatures likewise decrease with increasing radius of the flange. At some radial position on the flange, the temperature during uncooled operating conditions drops below about 1000° C. Beyond this radial position, nickel can safely be used for the flange material. If the nickel temperature limits, e.g., about 600° C. for long life, about 800° C. for intermediate life, or about 1000° C. for short periods of time, are exceeded under any condition, the joint between nickel and the high-temperature metal used in the inner part of the flange must be moved to a larger radius. Outward movement of the joint, of course, needs to be balanced against increased material costs since the high-temperature, and thus, high cost metal must then extend to a larger radius.

In practice, computer modeling will typically be used to take into account the various factors involved in selecting the radii and thicknesses of the rings making up the flange. Such modeling can be performed using commercially available or customized software packages which calculate electrical current flows for specified conductor properties and geometries, as well as packages that model heat flows and calculate temperature distributions for specified material properties and heat source/sink locations. For example, using such analyses, a suitable relationship for the thicknesses (t's) of the rings of FIG. 5 was found to be: $t_{140} > t_{141} > t_{142}$; $t_{150} \gg t_{151}$; and $t_{140} \approx t_{151}$, where rings 140, 141, and 142 were made of 90 wt. % platinum and 10 wt. % rhodium, and rings 150 and 151, as well as main bus bar 170 and cooling tube 160, were made of nickel 200. Other relationships can, of course, be used in the practice of the invention, the specific relationship which is suitable for any particular application of the invention being readily determined by persons skilled in the art from the present disclosure.

The rings and the bus bar used to construct the flange will typically be fabricated from flat metal sheets, e.g., nickel 200 or nickel 201 sheets for main bus bar 170 and rings 150 and 151, and a platinum-rhodium alloy (e.g., 90 wt. % platinum and 10 wt. % rhodium) for rings 140, 141, and 142. Metal sheets are commercially available in a limited set of thicknesses. As a result, the thickness of the flange will change in stepped amounts as one passes from one ring to the next. The steps are chosen so that the current density in each ring meets the specified criteria (see above) for the range of radial positions covered by the ring. In particular, the joints between the rings occur at radial positions such that the current density limits are not exceeded.

The joints between the rings are welded. The welds can be filleted to avoid re-entrant corners which can produce a locally high current density that can cause a joint to overheat and fail. The innermost ring is joined to outer wall 12 of vessel 10, usually by welding. Again, filleting can be used to avoid re-entrant corners. The thickness of the innermost ring is typically greater than the thickness of the vessel's wall 12, although other thicknesses can be used for the innermost ring if desired, e.g., the thickness of the innermost ring can be equal to or smaller than the thickness of wall 12.

Figure 6:
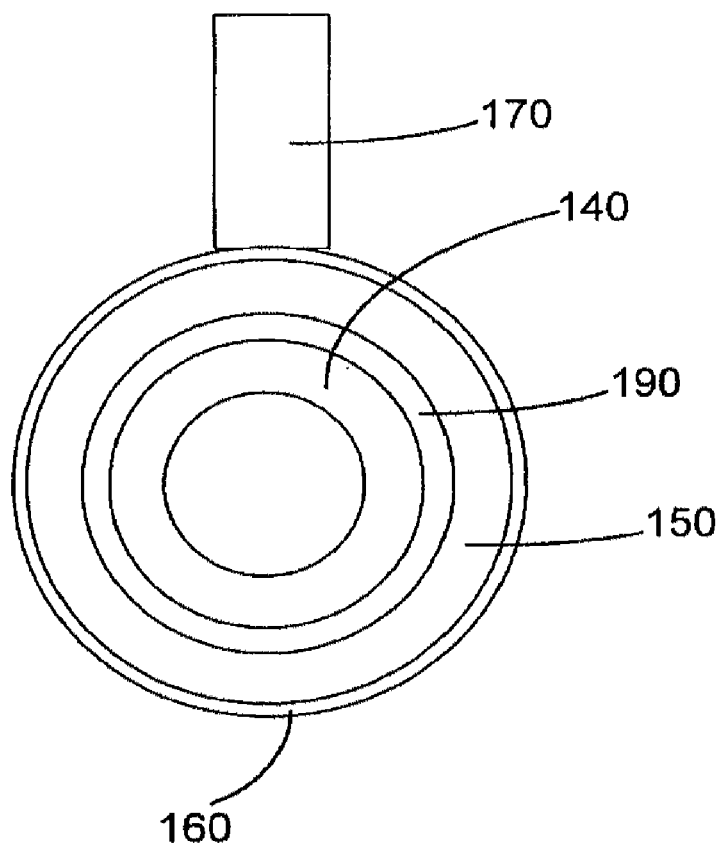
FIG. 6 is a plan view of a flange which includes a platinum-containing ring, a nickel-containing ring, a nickel-containing cooling tube, and a ring which comprises a platinum-nickel alloy.

FIG. 6 shows an additional embodiment of the invention which includes an intermediate ring 190 which comprises a platinum-nickel alloy. As discussed above, to achieve a long service life, the rings of the flange which comprise 99.0 wt. % nickel need to be located at positions where the operating temperature is below about 600° C. Above this temperature, nickel has a high rate of oxidation which limits its useful life.

As reported in the scientific literature, nickel-platinum alloys form adherent and protective scales when exposed to high temperatures in air and therefore oxidize at much lower rates than pure nickel. See, for example, C. Wagner and K. Grunewald, Z. Physik. Chem. B, 1938 vol 40 p455; O. Kubaschewski and O. von Goldbeck, J. Inst. Metals 1949 vol 76 p 255; D. E. Thomas, "Discussion—On the Mechanism of Oxidation of Nickel-Platinum Alloys", J. Inst. Metals, (1949), vol 76 pp. 738-741; and O. Kubaschewski and B. E. Hopkins, "Oxidation of Metals and Alloys", Academic Press, 1962.

In particular, the oxidation rate of platinum-nickel alloys is reported to start to decrease when the platinum content exceeds 50 mol %, i.e., 77 wt. % for an alloy which contains only platinum and nickel. See C. Wagner, "Theoretical Analysis of the Diffusion Processes Determining the Oxidation Rate of Alloys", J. Electrochem Soc., vol. 99 (1952), pp 369-380.

As a result of their lower rates of oxidation, nickel-platinum alloys can be used at higher temperatures than pure nickel. This, in turn, means that the amount of expensive, high-temperature metal used in a flange can be reduced since rings comprising a nickel-platinum alloy can be used at locations where a high-temperature metal would otherwise be needed.

Table 1 sets forth room temperature electrical resistance and thermal conductivity data for platinum, nickel, and representative nickel-platinum alloys. These data are from the ASM Handbook, Volume 2, "Properties and Selection: Nonferrous Alloys and Special-Purpose Materials", 1990, p 713 and Y. Terada, K Ohkubo, and T. Mohri, "Thermal Conductivities of Platinum Alloys at High Temperatures", Platinum Metals Review, 2005, vol 49, pp 21-26.

As these data show, nickel-platinum alloys have lower thermal conductivities and higher resistivities than platinum or nickel. These differences provide additional degrees of freedom which can be used to optimize power input and minimize heat loss. Moreover, a wide range of platinum-nickel alloys can easily be made since platinum and nickel form solid solutions over the entire composition range. It should be noted that the lower thermal conductivities of the alloys may be particularly useful since meaningful amounts of heat loss from vessel 10 can occur through water-cooled flanges composed of materials having high thermal conductivities. Excessive heat loss by this mechanism can create problems with glass quality. By using rings composed of platinum-nickel alloys, such heat losses can be reduced.

In terms of cost, it should be noted that an alloy comprising 90 wt. % platinum and 10 wt. % nickel is commercially available. Moreover, as with nickel, alloys of platinum and nickel are readily weldable to platinum and platinum-rhodium, which facilitates assembly of the flange.

From the foregoing, it can be seen that embodiments of the invention can include some or all of the following features:
(a) A disc-shaped metal flange that, during use, is welded to a high-temperature metal vessel (high-temperature metal tube) which contains and/or carries molten glass.
(b) A high-temperature metal comprising at least 80 wt. % platinum that forms the inner radial portions of the flange.
(c) At least 99.0 wt. % nickel that forms the outer radial positions of the flange.
(d) The thickness of the flange, specifically, the high-temperature metal part of the flange, can be reduced as the radius increases to minimize material usage while keeping electrical current density below a chosen level.
(e) The outer portion of the flange can include a circumferential bus bar which comprises at least 99.0 wt. % nickel; the bus bar dimensions are chosen to evenly distribute current around the circumference of the flange; the bus bar can be configured as the outermost ring of the flange.
(f) A cooling channel that comprises at least 99.0 wt. % nickel can be welded to the circumferential bus bar or, alternatively, machined into the bus bar.
(g) A linear (main) bus bar can be attached to the circumferential bus bar at one radial position to carry current from an electrical power circuit to the flange.
(h) When used with water cooling, the transition between the inner high-temperature metal ring(s) and the outer 99.0 wt. % nickel ring(s) can occur at a temperature less than or equal to 600° C.; when there is a loss of coolant, the temperature at the transition can remain below 1000° C.
(i) The flange can include one or more intermediate rings which comprise a platinum-nickel alloy, e.g., an alloy containing at least 77 wt. % platinum.

A variety of modifications which do not depart from the scope and spirit of the invention will be evident to persons of ordinary skill in the art from the foregoing disclosure. The following claims are intended to cover the specific embodiments set forth herein as well as such modifications, variations, and equivalents.

TABLE 1

| | Electrical Resistivity Nano-ohm meter | Thermal Conductivity W/meter * K |
|---|---|---|
| Platinum | 98 | 71.1 |
| Pt—5% Ni | 236 | Estimate - 29 |
| Pt—10% Ni | 298 | Estimate - 23 |
| Pt—15% Ni | 330 | Estimate - 21 |
| Pt—20% Ni | 350 | Estimate - 20 |
| Nickel | 68 | 88 |

What is claimed is:

1. A flange for use in direct resistance heating of a vessel which, during use, carries molten glass and which comprises an exterior wall which comprises at least 80% platinum, said flange comprising:

(a) a plurality of electrically-conductive rings which, during use, form a conductive path for carrying current to the exterior wall, said plurality of rings comprising:
   (i) an innermost ring which is joined to and electrically connected with the vessel's exterior wall during use of the flange; and
   (ii) an outermost ring which receives electrical current during use of the flange; and
(b) a cooling channel associated with the outermost ring through which a cooling fluid flows during use of the flange;
wherein:
   (i) the innermost ring comprises a high-temperature metal which comprises at least 80% platinum;
   (ii) the outermost ring comprises at least 99.0% nickel;
   (iii) the plurality of electrically conductive rings comprises:
      (A) a ring which (I) is located between the innermost and outermost rings, (II) comprises a high-temperature metal which comprises at least 80 wt. % platinum, and (III) has a thickness which is less than the thickness of the innermost ring; and
      (B) a ring which (I) is located between the innermost and outermost rings, (II) comprises at least 99.0 wt. % nickel, and (III) has a thickness which is less than the thickness of the outermost ring; and
   (iv) the rings which comprise a high-temperature metal which comprises at least 80 wt. % platinum are inboard of the rings which comprise at least 99.0 wt. % nickel.

2. The flange of claim 1 wherein:
(a) said cooling channel is in the form of a cooling tube that is joined to and thermally connected with at least a portion of the outermost ring; and
(b) the cooling tube comprises at least 99.0 wt. % nickel.

3. The flange of claim 1 wherein the cooling tube is welded to the outermost ring.

4. The flange of claim 1 wherein, during use of the flange, the outermost ring receives electrical current along a portion of its outer periphery from a bus bar which comprises at least 99.0 wt. % nickel.

5. The flange of claim 4 wherein:
(a) the outermost ring has an inner periphery through which current passes during use of the flange; and
(b) the outermost ring has a sufficient thickness so that during use of the flange, the variation in calculated radial electrical current density along said inner periphery is less than fifty percent.

6. The flange of claim 1 wherein
the plurality of electrically conductive rings comprises a ring which (A) is located between the outermost and innermost rings and (B) comprises a platinum-nickel alloy.

7. The flange of claim 6 wherein the platinum-nickel alloy comprises at least 77 wt. % platinum.

8. The flange of claim 1 wherein the plurality of rings are welded to neighboring rings.

9. The flange of claim 1 wherein during use, the innermost ring is welded to the exterior wall of the vessel.

10. The flange of claim 1 wherein the innermost ring has a thickness which is greater than the thickness of the exterior wall of the vessel.

11. The flange of claim 1 wherein the plurality of rings are substantially circular.

12. The flange of claim 1 wherein the vessel is a finer.

* * * * *